US012737469B2

(12) United States Patent
Soni et al.

(10) Patent No.: US 12,737,469 B2
(45) **Date of Patent: *Sep. 15, 2026**

(54) FIRMWARE-BASED SECURE TENANCY TRANSFER

(71) Applicant: Microsoft Technology Licensing, LLC, Redmond, WA (US)

(72) Inventors: Vishal Soni, Redmond, WA (US); Bryan David Kelly, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/614,183

(22) Filed: Mar. 22, 2024

(65) Prior Publication Data

US 2025/0190572 A1 Jun. 12, 2025

Related U.S. Application Data

(63) Continuation of application No. 17/335,980, filed on Jun. 1, 2021, now Pat. No. 11,971,993.

(51) Int. Cl.

| | |
|---|---|
| ***G06F 21/57*** | (2013.01) |
| ***H04L 9/30*** | (2006.01) |
| ***H04L 9/32*** | (2006.01) |

(52) U.S. Cl.

CPC .............. *G06F 21/575* (2013.01); *H04L 9/30* (2013.01); *H04L 9/3236* (2013.01)

(58) Field of Classification Search

CPC ........ G06F 21/575; H04L 9/30; H04L 9/3236

See application file for complete search history.

(56) References Cited

U.S. PATENT DOCUMENTS

| | | | | |
|---|---|---|---|---|
| 7,577,954 | B2 * | 8/2009 | Shiota | G06F 9/30189 718/100 |
| 7,971,045 | B1 * | 6/2011 | Currid | G06F 9/4408 713/1 |
| 9,264,890 | B2 * | 2/2016 | Polson | H04W 12/04 |
| 9,870,488 | B1 * | 1/2018 | Pedersen | G06F 21/76 |
| 10,146,556 | B2 * | 12/2018 | Rose | G06F 9/4416 |

(Continued)

OTHER PUBLICATIONS

Decision to grant a European patent pursuant to Article 97(1) Received in European Patent Application No. 22725637.7, mailed on May 30, 2025, 02 pages.

(Continued)

*Primary Examiner* — Aurel Prifti

(57) ABSTRACT

A system includes a stored counter value and a stored boot manifest including a manifest type flag. A manifest type of the boot manifest is determined based on the manifest type flag, a tenancy mode is determined based on a parity of the counter value, a first boot is executed if the manifest type is a first manifest type and the tenancy mode is a first tenancy mode, a second boot flow is executed if the manifest type is the first manifest type and the tenancy mode is a second tenancy mode, a third boot flow is executed if the manifest type is a second manifest type and the tenancy mode is the first tenancy mode, and a fourth boot flow is executed if the manifest type is the second manifest type and the tenancy mode is the second tenancy mode.

20 Claims, 17 Drawing Sheets

(56) References Cited

U.S. PATENT DOCUMENTS

| | | | | |
|---|---|---|---|---|
| 11,775,690 | B2 * | 10/2023 | Khatri | G06F 21/62 713/2 |
| 2009/0222816 | A1 * | 9/2009 | Mansell | G06F 12/145 718/1 |
| 2013/0042098 | A1 * | 2/2013 | Baik | G06F 9/445 713/2 |
| 2018/0004954 | A1 * | 1/2018 | Liguori | H04L 9/14 |
| 2020/0287709 | A1 * | 9/2020 | Bradbury | G06F 12/1408 |
| 2021/0004242 | A1 * | 1/2021 | Su | G06F 9/4416 |
| 2021/0211431 | A1 * | 7/2021 | Albero | G06F 21/6218 |
| 2022/0100861 | A1 * | 3/2022 | Sayyed | G06F 21/565 |
| 2022/0164193 | A1 * | 5/2022 | Choi | G06F 9/45558 |
| 2022/0303284 | A1 * | 9/2022 | Al Qasimi | G06F 21/6236 |
| 2023/0297390 | A1 * | 9/2023 | Hung | G06F 9/4401 713/2 |
| 2023/0359741 | A1 * | 11/2023 | Zhang | H04L 9/3247 |

OTHER PUBLICATIONS

Communication under Rule 71(3) Received in European Patent Application No. 22725637.7, mailed on Jan. 2, 2025, 08 pages.
First Examination Report Received for Indian Application No. 202317074906, mailed on Jul. 15, 2026, 08 Pages.

* cited by examiner

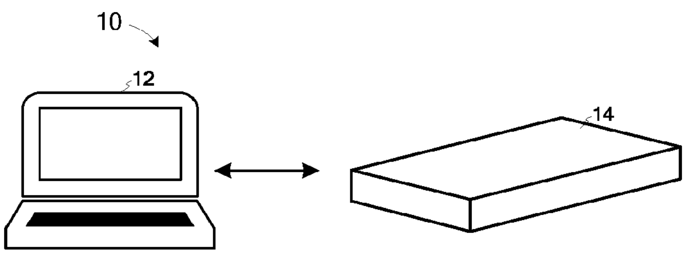
FIG. 1A
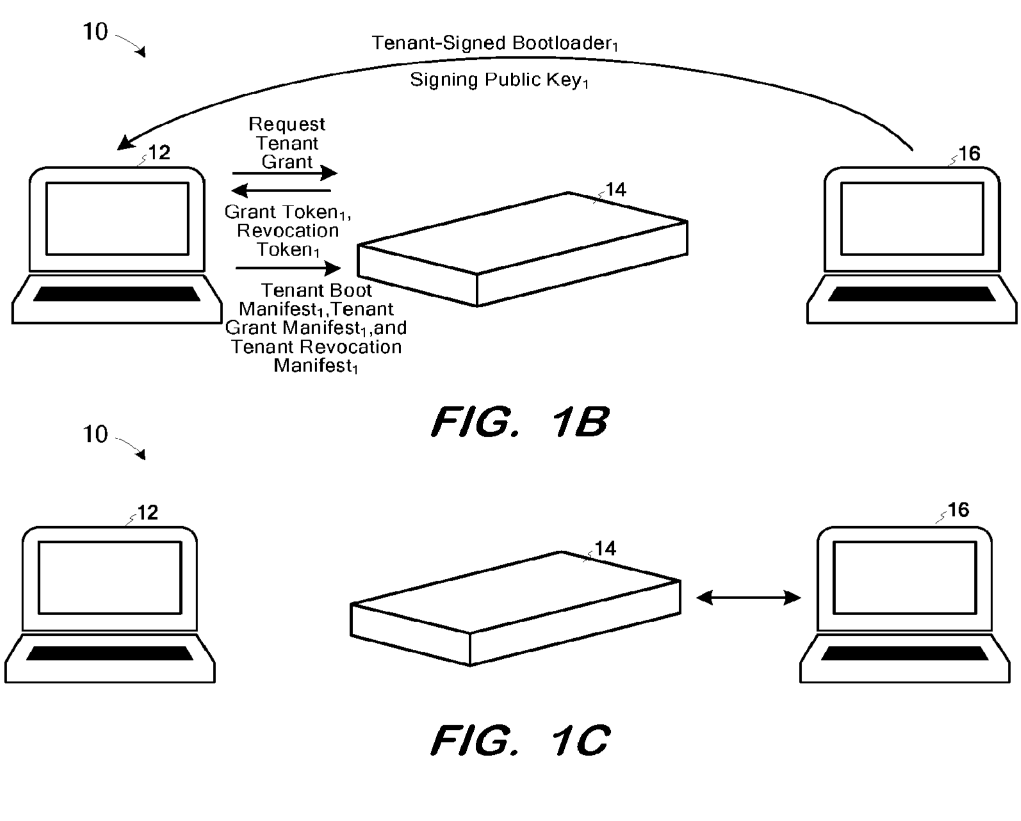
FIG. 1B
FIG. 1C
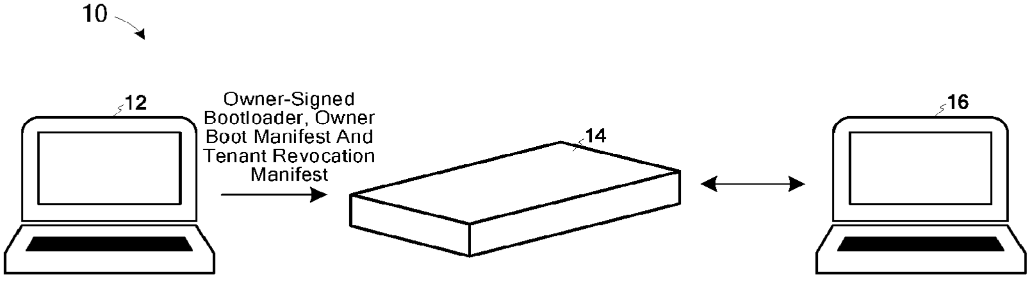
FIG. 1D

FIG. 11
FIG. 12
FIG. 13
1100
Tenant Grant Manifest Signature
1110
Manifest Hash
Manifest Size
1120
Grant Token
Tenant Bootloader Signing Public Key
1130
1200
Tenant Revocation Manifest Signature
1210
Type = 01 (i.e., Machine)
Reserved
Manifest Hash
Manifest Size
1220
Revocation Token
1230
1300
Boot Manifest Signature
Boot Manifest Signing Public Key
1310
Type = 01 (i.e., Tenant)
Reserved
Manifest Hash
Manifest Size
1320
Tenant Grant Manifest Signing Public Key
Tenant Revocation Manifest Signing Public Key
1330

FIRMWARE-BASED SECURE TENANCY TRANSFER

CROSS-REFERENCE TO RELATED APPLICATIONS

This application is a continuation of U.S. patent application Ser. No. 17/335,980 filed Jun. 1, 2021, entitled "Firmware-Based Secure Tenancy Transfer," which is incorporated herein by reference in its entirety.

BACKGROUND

Infrastructure-as-a-Service, or "IaaS," is a form of cloud computing that provides on-demand compute, network, and storage resources to consumers over the internet. The resources are presented as abstractions implemented by physical machines, or servers, located in cloud-connected datacenters. For example, a consumer may access compute resources in the form of a virtual machine executing on a hypervisor layer within a server. The consumer is unable to access the underlying hardware of the server, and the server may support virtual machines of more than one consumer.

In a "bare metal" scenario, a tenant is provided dedicated access to the physical hardware of a given server, as opposed to a virtual server created on a hypervisor layer. Accordingly, the tenant is able to configure the physical processor, memory, and storage of the given server. Since the hardware is not virtualized and does not support multiple virtual machines, the tenant is able to consume all resources within the server. A tenant may run any desired operating system and applications on the server, including a hypervisor for creating virtual machines which may be used by the tenant.

Providing a tenant with dedicated access to a physical server raises several issues. First, the tenant should be assured that the owner of the server (i.e., a cloud provider) will be unable to execute code on the server while control of the server is with the tenant. Second, the owner should be able to revoke a tenant's access even if the tenant does not consent to the revocation. Third, the owner should be able to grant dedicated access to a next tenant after revoking access of a prior tenant, and to perform this grant-revoke-grant cycle one or more times over the lifetime of the server.

Current systems attempt to address the foregoing by: 1) Provisioning a new owner's key into flash memory at each transfer; 2) Providing an initialization phase in which a new owner's key is encrypted or signed with an on-device secret; or 3) Providing an initialization phase in which a new owner activates their key and deactivates a manufacturer key using a one-time-programmable fuse array divided into key slots. Each of these systems presents limitations on transfer cycles, flash memory vulnerabilities and/or susceptibility to replay attacks. Systems are therefore desired to suitably and efficiently address security issues arising from transfers of a given physical server between an owner and one or more successive tenants.

BRIEF DESCRIPTION OF THE DRAWINGS

FIGS. 1A through 1G illustrate a tenancy grant, a tenancy revocation and a second tenancy grant according to some embodiments.

DETAILED DESCRIPTION

Figure 1E:
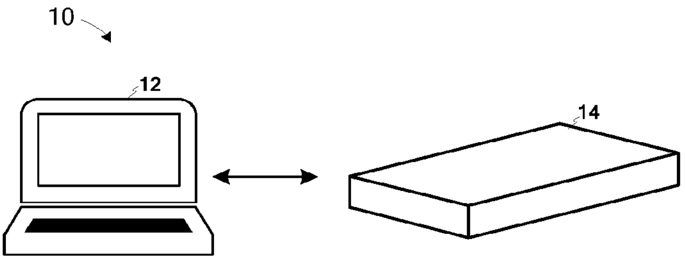

The following description is provided to enable any person in the art to make and use the described embodiments. Various modifications, however, will be apparent to those in the art.

A transfer of tenancy generally refers herein to a change in control over the bootloader image which is executed by the hardware platform. Tenancy may be transferred via any contractual arrangement, including but not limited to rental, lease or sale, and may be associated with a specified or open-ended duration. Tenancy transfer according to some embodiments utilizes a grant token which is cryptographically bound to the specific hardware platform to prevent its usage on other hardware platforms. After tenancy transfer, a tenant is able to sign firmware and software with its own keys without reliance on the keys of the owner or a third-party. Tenancy can be revoked by the tenant or the owner via a tenancy revocation process which utilizes a hardware platform-specific revocation token.

According to some embodiments, once an owner transfers tenancy of a hardware platform to a tenant, the owner will be unable to execute code on the hardware platform or revoke the tenancy without creating irrefutable and verifiable cryptographic evidence on the hardware platform. However, the owner maintains the ability to revoke tenancy (even without the tenant's consent) by altering the cryptographic state of the system in order to render previously-executable tenant code non-executable. The tenancy transfer and tenancy revocation processes therefore both generate irrefutable cryptographic evidence of a change in tenancy.

The generation of this evidence according to some embodiments may advantageously serve to maintain trust and confidentiality between tenants and owners.

FIGS. 1A through 1G illustrate a tenancy grant, a tenancy revocation and a second tenancy grant according to some embodiments. FIGS. 1A through 1G will be discussed below to provide an overview of some embodiments, and additional implementation details will follow.

Architecture 10 of FIG. 1A includes owner device 12 and hardware platform 14. Generally, a hardware platform as described herein includes one or more Central Processing Units (CPUs), random access memory and compatible hardware (e.g., chipset, Graphics Processing Unit, Solid State Drives, cooling devices, I/O devices) which provide an environment for the execution of software applications. Hardware platform 14 may comprise a blade server or a rack server installed within a server rack located in a datacenter remote from owner device 12, but embodiments are not limited thereto. For example, hardware platform 14 may comprise a desktop computer, a laptop computer, a tablet computer, a smartphone, or a wearable device.

Owner device 12 is depicted as a laptop computer but may comprise any device suitable for communicating with hardware platform 14 and exchanging electronic files therewith. For the sake of simplicity, architecture 10 omits intermediate networks, devices and software components which may facilitate this communication and exchange. In some embodiments, device 12 accesses a cloud-based administration application (e.g., via a Web browser) to initiate communication with hardware platform 14. The cloud-based administration application passes corresponding requests to a cloud-based orchestrator component which in turn communicates with a fabric controller of a server rack of a cloud datacenter in which hardware platform 14 is installed.

Hardware platform 14 includes a hardware-based Root of Trust (RoT). The RoT may comprise a microcontroller or may be embedded within a CPU of hardware platform 14, for example. During a power-on sequence, the RoT verifies firmware as described herein prior to execution thereof by hardware platform 14.

Briefly, hardware platform 14 includes a secure storage device (e.g., a one-time-programmable (OTP) fuse, a persistent monotonic counter, a hardware-protected and persistent non-volatile memory (NVM)) storing a representation (e.g., a hash) of an owner's public key. The hardware platform also includes a secure storage device for storing a counter. At reset, the RoT loads a boot manifest from a firmware storage device (e.g., a flash memory storage device) and confirms whether the representation of the owner's public key stored in the OTP fuse matches a representation within the boot manifest. If not, booting of hardware platform 14 is halted. If so, the boot manifest signature is verified using the owner's public key. If signature verification is successful, the boot manifest type (i.e., owner or tenant) is determined. The boot process then continues, as will be described below, based on the determined boot manifest type and on a parity of the value stored in the counter.

It will be assumed that the boot manifest type and parity of the value stored in the counter indicate execution of an owner secure boot flow. Accordingly, a bootloader image stored in the firmware storage device is verified using the owner's public key, loaded if the verification is successful, and executed. Booting of hardware platform 14 then continues based on the bootloader image and owner device 12 may subsequently interact therewith as is known in the art. For example, owner device 12 may install and configure applications on hardware platform 14 and execute those applications to utilize their functionality directly and/or to expose the functionality to public users for consumption over the Web.

FIG. 1B illustrates provisioning of a tenancy grant by owner device 12 according to some embodiments. In this regard, owner device 12 depicted in FIGS. 1A through 1G may represent different devices under control of the owner of hardware platform 14 (i.e., all actions attributed to owner device 12 of FIGS. 1A though 1G need not be performed by a same computing device).

Arthitecture 10 of FIG. 1B includes tenant device 16, which may comprise any suitable computing device for communicating with owner device 12. Tenant device 16 transmits a bootloader image (i.e., Tenant-Signed Bootloader$_1$) signed by the tenant's bootloader signing certificate and the tenant's public key (i.e., Signing Public Key$_1$), which corresponds to the signing certificate, to owner device 12. The bootloader image and public key may be provided to owner device 12 via any suitable means, including but not limited to a portable storage device and a secure file repository.

As shown in FIG. 1B, owner device 12 requests a tenant grant from hardware platform 14 and receives a grant token (i.e., Grant Token$_1$) and a revocation token (i.e., Revocation Token$_1$) in response. According to some embodiments, owner device 12 may request the tenant grant via a tenancy administration agent provided by an administration application as described above. Hardware platform 14 may generate the grant token and the revocation token based on a device secret securely stored on hardware platform 14 and on a value equal to the current value of the tenancy counter+1.

Owner device 12 generates Tenant Grant Manifest$_1$ using Grant Token$_1$ and Signing Public Key$_1$, and signs Tenant Grant Manifest$_1$ using a tenant grant manifest signing certificate. Tenant Grant Manifest$_1$ binds the tenant to hardware platform 14 by including the device-specific grant token and the tenant signing public key, and is bound to the owner via its signing by the tenant grant manifest signing certificate owned by the owner. Similarly, owner device 12 generates Tenant Revocation Manifest$_1$ using Revocation Token$_1$ and Signing Public Key$_1$, and signs Tenant Revocation Manifest$_1$ using a tenant revocation manifest signing certificate. Tenant Boot Manifest$_1$ is also created to include the tenant grant manifest signing public key and the tenant revocation manifest signing public key, and is signed using the owner's boot manifest signing certificate.

Owner device 12 may then operate the tenancy administration agent to store Tenant Boot Manifest$_1$, Tenant Grant Manifest$_1$, Tenant Revocation Manifest$_1$ and Tenant-signed Bootloader$_1$ in a flash storage device of hardware platform 14. Tenant Boot Manifest$_1$ and Tenant-signed Bootloader$_1$ may overwrite respective Owner Boot Manifest and Owner-signed Bootloader which were previously stored in the flash storage device.

Hardware platform 14 is rebooted thereafter to continue the tenancy transfer. Upon reset, the RoT verifies and loads the stored boot manifest (now Tenant Boot Manifest$_1$) as described above. Tenant Boot Manifest$_1$ includes a flag indicating that it is a tenant boot manifest, causing the RoT to load the stored tenant grant manifest header and confirm whether it is signed with the tenant grant manifest signing certificate. The RoT also generates a grant token based on the device secret of hardware platform 14 and on a current value of the tenancy counter. If this newly-generated grant token is identical to the grant token of the tenant grant manifest, the tenancy counter is incremented by 1.

Hardware platform 14 is rebooted once more. The stored boot manifest (i.e., Tenant Boot $Manifest_1$) is again verified and loaded, and the grant token generation and verification are executed as described above. The headers of the stored bootloader image (i.e., Tenant-signed $Bootloader_1$) are loaded and signature-verified based on the bootloader signing public key (Signing Public $Key_1$) stored in the tenant grant manifest (Tenant Grant $Manifest_1$).

If all verifications are successful, the bootloader image (i.e., Tenant-signed $Bootloader_1$) is fully loaded and booting continues based thereon as is known in the art. At this point, tenant device 16 may install, configure and execute applications on hardware platform 14 as illustrated at FIG. 1C.

FIG. 1D illustrates owner-initiated tenancy revocation provisioning according to some embodiments. As shown, owner device 12 copies an owner-signed bootloader, a signed owner boot manifest and the tenant revocation manifest to hardware platform 14, which is thereafter rebooted.

Upon reboot, hardware platform 14 verifies and loads the stored boot manifest (now an owner-signed boot manifest) as described above. The parity of the tenancy counter is odd due to the prior incrementing of the value, and the owner-signed boot manifest includes a flag indicating that it is an owner tenant boot manifest. In response to these two factors, hardware platform 14 executes a tenancy revocation flow. In particular, the RoT generates a revocation token based on the device secret of hardware platform 14 and on a current value of the tenancy counter. If this newly-generated revocation token is identical to the revocation token of the stored tenant revocation manifest, the tenancy counter is incremented by 1 and hardware platform 14 is rebooted.

This reboot places hardware platform 14 in a similar state as shown in and described with respect to FIG. 1A, now illustrated in FIG. 1E. The flag of the current boot manifest (i.e., Owner) and the parity of the tenancy counter (i.e., Even) indicate that hardware platform 14 is configured to boot in an owner-controlled mode. The tenancy counter has been incremented from that illustrated in FIG. 1C, evidencing the transfer of tenancy from the tenant to the owner.

Figure 1F:
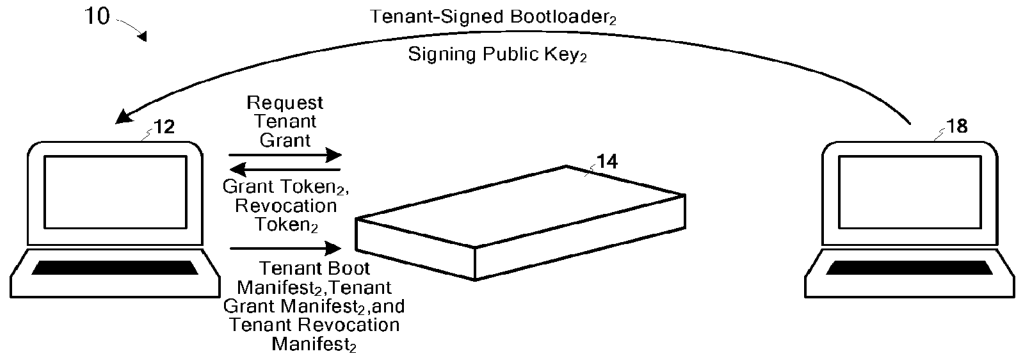

FIG. 1F illustrates a tenancy transfer to a second tenant according to some embodiments. As shown, the second tenant operates tenant device 18 to provide a bootloader image (i.e., Tenant-Signed $Bootloader_2$) signed by the second tenant's bootloader signing certificate and the second tenant's public key (i.e., Signing Public $Key_2$), which corresponds to the signing certificate, to owner device 12.

As described above, owner device 12 requests a tenant grant from hardware platform 14 and receives a grant token (i.e., Grant $Token_2$) and a revocation token (i.e., Revocation $Token_2$) in response. Hardware platform 14 may generate the grant token and the revocation token based on the aforementioned immutable device secret stored on hardware platform 14 and on a value equal to the current value of the tenancy counter+1. Notably, this value is different from (i.e., +2) the value used to generate the prior grant and revocation tokens. Accordingly, Grant $Token_2$ and Revocation $Token_2$ will differ from Grant $Token_1$ and Revocation $Token_1$.

Figure 1G:
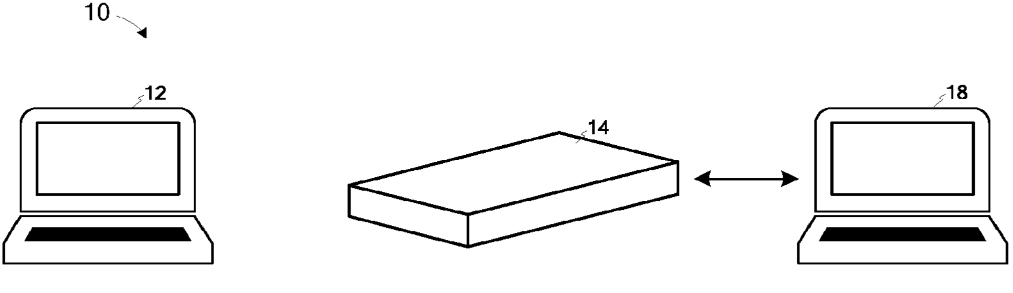

Owner device 12 generates Tenant Boot $Manifest_2$, Tenant Grant $Manifest_2$ and Tenant Revocation $Manifest_2$ as described above with respect to Tenant Boot $Manifest_1$, Tenant Grant $Manifest_1$ and Tenant Revocation $Manifest_1$. Owner device 12 then stores Tenant Boot $Manifest_2$, Tenant Grant $Manifest_2$ and Tenant Revocation $Manifest_2$ in a flash storage device of hardware platform 14. Hardware platform 14 is then rebooted twice as described above to complete the tenancy transfer to the second tenant. As illustrated at FIG. 1G, tenant device 18 may thereafter install, configure and execute applications on hardware platform 14 as desired.

Figure 2:
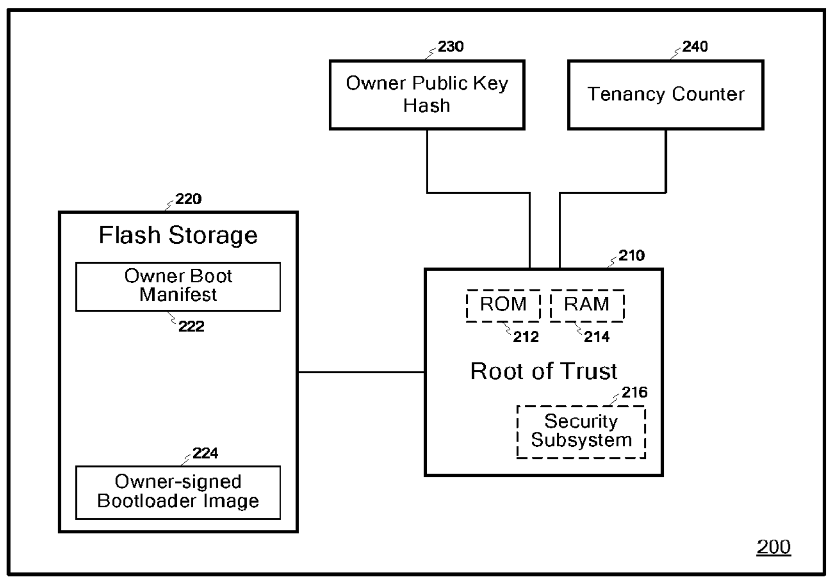
FIG. 2 is a block diagram of a portion of a hardware platform according to some embodiments.

FIG. 2 is a block diagram of a portion of a hardware platform according to some embodiments. RoT 210, flash storage device 220, secure storage device 230 and secure storage device 240 are mounted to motherboard 200. According to some embodiments, motherboard 200 electrically connects RoT 210 to each of flash storage device 220, storage device 230 and storage device 240 to provide communication therebetween as described herein. Motherboard 200 also provides power to RoT 210 and flash storage device 220 for operation as described herein. Motherboard 200 may support other discrete components and integrated circuit devices, including at least one CPU. Motherboard 200 and the components mounted thereon are also supported by power supply and cooling components as is known in the art.

RoT 210 may comprise a microcontroller or any other logic device capable of performing the functions attributed thereto herein. According to some embodiments, RoT 210 comprises an Advanced RISC Machine (ARM) controller. RoT 210 includes executable program code stored in Read-Only Memory (ROM) 212. The program code stored in ROM 212 is considered immutable in that it cannot be changed or updated. The program code stored in ROM 212 is executed by RoT 210 at the start of a boot process in order to perform many of the tenancy transfer-related processes described herein.

Random Access Memory (RAM) 214 may store program code and data during operation of RoT 210. As described herein, RoT 210 may load headers, manifests and bootloader images from flash storage device 220 into RAM 214 for evaluation or execution thereof. RAM 214 may be integrated with RoT 210 as depicted in FIG. 2 and/or a provided by a separate storage device.

RoT 210 also includes security subsystem 216 according to some embodiments. Security subsystem 216 may provide asymmetric key-based decryption, cryptographic key derivation and signature verification. Security subsystem 216 may also store a unique device secret associated with the hardware platform and which is used to generate grant and revocation tokens associated with the hardware platform. The unique device secret may be stored in a separate secure storage device, such as a fuse bank accessible to RoT 210, according to some embodiments.

Flash storage device 220 may comprise writable firmware storage as is known in the art. RoT 210 may load portions of files stored in flash storage device 220 directly into RAM 214. As shown, prior to a transfer of control to a tenant, flash storage device 220 may store owner boot manifest 222 and owner-signed bootloader image 224.

Secure storage device 230 may comprise an array (e.g., 8 to 16) of fuse banks with each bank comprising 384 bits of OTP Error Correction Code (ECC) fuses. According to some embodiments, a 384-bit value burned into a fuse bank of secure storage device 230 represents a Secure Hash Algorithm (SHA)-384 hash of an Elliptic Curve Digital Signature Algorithm (ECDSA)-384 public key which will be used to verify a signed owner boot manifest. Secure storage device 230 may be implemented by a persistent monotonic counter, a hardware-protected and persistent NVM, or any other suitable read-only device.

Secure storage device 240 may also comprise a fuse bank of OTP ECC fuses according to some embodiments. Secure storage device 240 is used to maintain a tenancy counter, or Tenant Security Version Number (TSVN). As described herein, the value of the counter is incremented each time a tenancy is granted or revoked. The size of secure storage device 240 determines a maximum number of allowed tenancy transfers. For example, in a case that secure storage device 240 includes 512 bits of fuses, 256 tenancy transfers will be supported.

To maintain cryptographic security, secure storage device 240 must only be updatable by execution of the immutable code stored ROM 212. This code is initially executed upon platform boot, at which point RoT 210 may execute the code to increment the stored value as required by the execution logic. Once RoT 210 exits execution of the code of ROM 212, storage device 240 is locked to prevent any write access.

Figure 3:
FIG. 3 illustrates the structure of an owner boot manifest according to some embodiments.

FIG. 3 illustrates the structure of owner boot manifest 300 according to some embodiments. Owner boot manifest 300 may comprise an implementation of owner boot manifest 222 of FIG. 2. In this regard, a boot manifest stored at a corresponding partition of flash storage device 220 is the first structure loaded by RoT 210 into RAM 214 during execution of the code of ROM 212.

Owner boot manifest 300 includes unsigned manifest header 310, signed manifest header 320 and manifest 330. Unsigned manifest header 310 includes contains a boot manifest signature and a boot manifest signing public key. Moreover, signed manifest header 320 includes a manifest hash and a flag indicating a type (i.e., owner or tenant) of boot manifest 300. Accordingly, RoT 210 may decrypt the signature using the boot manifest signing public key and compare the result to the manifest hash to verify whether manifest 330 was signed by the manifest signing certificate corresponding to the boot manifest signing public key. If so, RoT 210 may trust the contents of manifest 330, which include a tenant revocation manifest signing public key and a bootloader signing public key.

Figure 4:
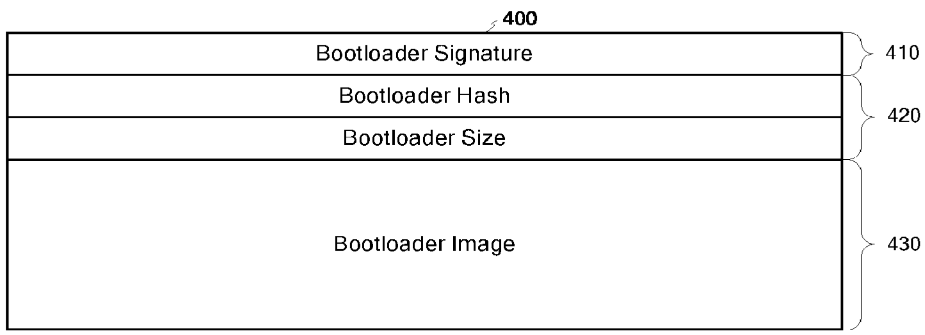
FIG. 4 illustrates the structure of a bootloader image according to some embodiments.

Bootloader image 400 of FIG. 4 may comprise an implementation of owner-signed bootloader image 224 of FIG. 2. Bootloader image 400 includes unsigned header 410, signed header 420 and bootloader image 430. Under certain conditions as will be described below, RoT 210 may use the bootloader signing public key of owner boot manifest 300 to decrypt unsigned header 410 and may then compare the result to the bootloader hash of signed header 420 to verify whether bootloader image 430 was signed by the owner's bootloader signing certificate. If so, RoT 210 may load bootloader image 430 into RAM 214 and execute bootloader image 430 therefrom.

Figure 5:
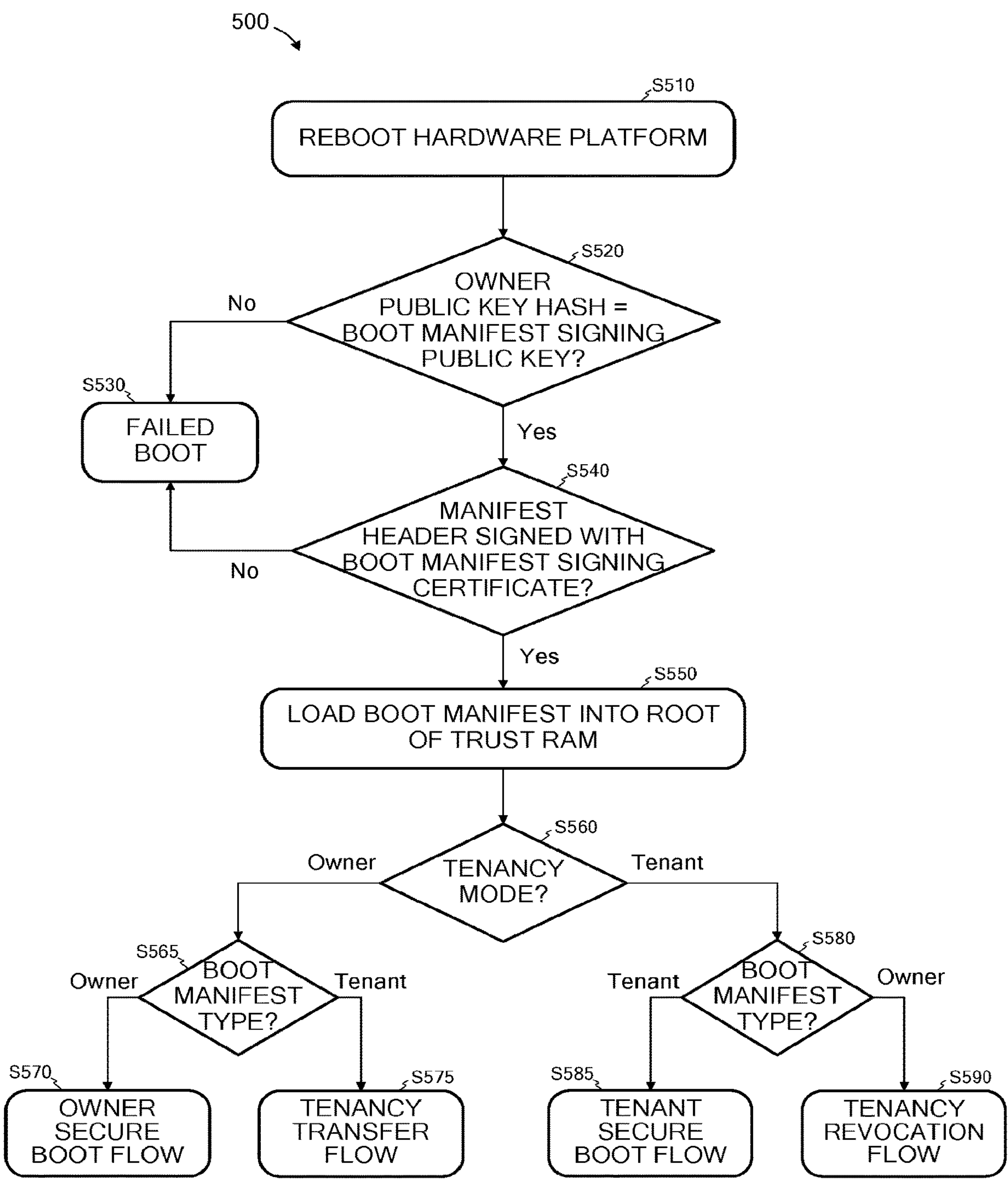
FIG. 5 is a flow diagram of a process to verify a boot manifest and to select a boot flow according to some embodiments.

FIG. 5 is a flow diagram of process 500 to verify a boot manifest and to select a boot flow according to some embodiments. Process 500 may be implemented in executable program code and/or in hardware. Such executable program code may be stored in an un-modifiable manner, such as within ROM 212 of RoT 210. Process 500 may be executed by one or more processing units (e.g., processors, processor cores) executing program code, including but not limited to RoT 210.

A subject hardware platform is rebooted at S510. The reboot may be software-initiated (e.g., in response to a command received from an orchestrator application) or hardware-initiated (e.g., manual operation of an on/off switch). Rebooting may comprise application of main power to the hardware platform. Prior to S510, the hardware platform may be receiving standby power and/or battery power (e.g., to power a Real Time Clock).

Conventionally, the applied power initially passes through in-rush circuity to a Complex Programmable Logic Device (CPLD), which ensures that the power rails (e.g., 3.3V, +5V, +12V) of the platform are energized in a time-sensitive sequence. The sequence ensures that a lower-voltage power rail is stable before a next-highest voltage power rail is energized. As the power-on sequence progresses towards final stages, an RoT, CPU, and other powered components of the hardware platform are held in reset. A power good signal is asserted once the highest-voltage power rail is stable, which causes the RoT to come out of reset and begin booting.

Booting starts at S520, in which it is determined whether a stored representation of the owner's public key matches a public key within a stored boot manifest. As described above, flash storage device 220 may include owner boot manifest 222, of which owner boot manifest 300 is an example. At S520, RoT 210 may load unsigned header 310 into RAM 214. RoT 210 compares the boot manifest signing public key of header 310 with the key stored in storage device 230. Both boot manifest signing public key of header 310 and the key stored in storage device 230 may comprise key hashes. The boot process is halted at S520 if the keys (or key hashes) are not identical, and proceeds to S540 if they are identical.

At S540, it is determined whether the manifest header was signed with the owner's boot manifest signing certificate. S540 may comprise loading unsigned manifest header 310 and signed manifest header 320 into RAM 214, decrypting the signature of unsigned manifest header 310 using the boot manifest signing public key of header 310, and comparing the result to the manifest hash of signed manifest header 320. The boot process fails at S520 if the result does not match the hash, indicating that the manifest header is not signed with the owner's boot manifest signing certificate. The boot manifest is loaded into RAM 214 at S550 if is determined at S540 that the manifest header was signed with the owner's boot manifest signing certificate.

The RoT determines a next boot flow to execute based on the loaded boot manifest signed header and the parity of the tenancy counter value. First, at S560, a tenancy mode is determined based on the parity of the value stored in the tenancy counter. It will be assumed that no tenancy transfers of the hardware platform have yet occurred, and the tenancy counter is therefore set to 0. Since even values of the tenancy counter are associated with an owner mode, flow proceeds to S565. The initial value of the tenancy counter may comprise any other owner-associated (e.g., even) value.

A type of the current boot manifest is determined at S565. As described above, signed manifest header 320 includes a flag indicating a type of boot manifest 300. RoT 210 may therefore determine the type of the boot manifest stored in flash storage device 220 based on this flag. Continuing the present example, the type is "owner" and flow therefore proceeds to S570.

Figure 6:
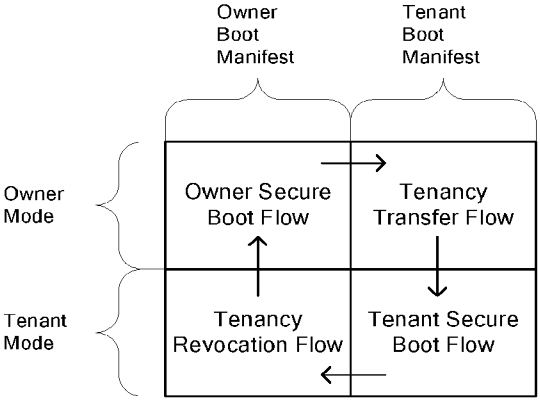
FIG. 6 depicts relationships between boot flows, tenancy mode and manifest type according to some embodiments.

Process 500 shows selection of one of four different boot flows depending on the boot manifest type and the parity of the tenancy counter value. According to some embodiments, a lifecycle of a hardware platform may progress successively through each of these flows as illustrated in FIG. 6. For example, the upper-left quadrant of the FIG. 6 diagram indicates performance of an owner secure boot flow in a case that a signature-verified owner boot manifest is present in the flash storage device and the parity of the tenancy counter value indicates that the hardware platform is in owner mode.

Boot-up always proceeds in this manner until, at some subsequent reboot, it is determined that the signature-verified boot manifest in the flash storage device is a tenant boot manifest, for example by virtue of a tenant-associated flag within the signed header of the manifest. The hardware platform currently remains in owner mode, and therefore a tenancy transfer flow of the upper-right quadrant is executed instead of the owner secure boot flow.

At a next reboot, it is determined that the signature-verified boot manifest is a tenant boot manifest and that the parity of the tenancy counter has changed (as will be described below) to indicate a tenant mode. Accordingly, a tenant secure boot flow of the lower-right quadrant is executed.

The tenant secure boot flow is executed at boot-up until, during a given reboot, it is determined that the signature-verified boot manifest in the flash storage device is an owner boot manifest (e.g., because the owner or tenant has copied an owner boot manifest to the flash storage device). Therefore, instead of executing the tenant secure boot flow, a tenant revocation flow of the lower-left quadrant is executed. During the tenant revocation flow, the tenancy counter is incremented. Accordingly, at a next reboot, it is determined that the parity of the tenancy counter has changed to indicate an owner mode. If a signature-verified owner boot manifest is also present, then the owner secure boot flow is executed as described above.

Figure 7:
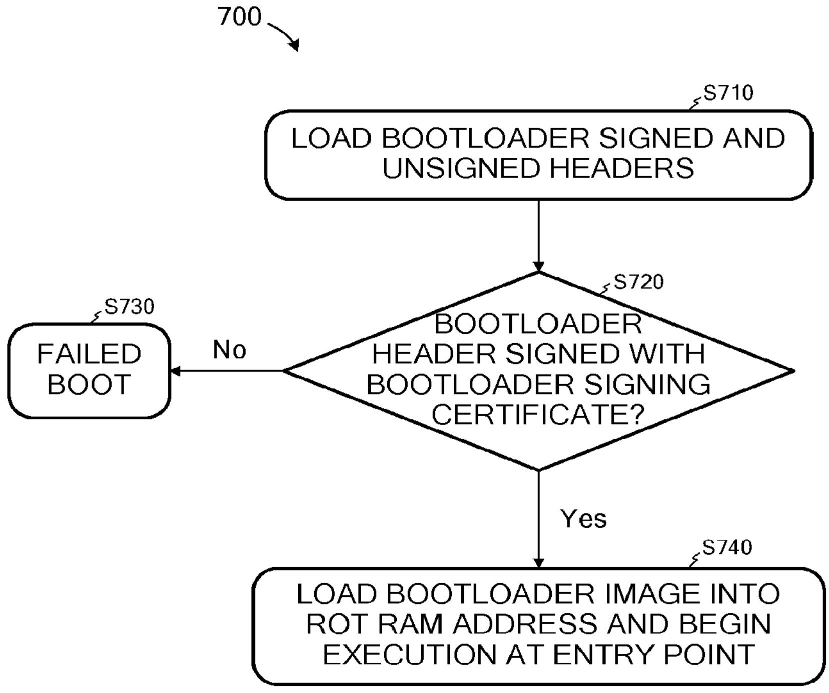
FIG. 7 is a diagram of an owner secure boot flow according to some embodiments.

FIG. 7 is a flow diagram of process 700 of an owner secure boot flow according to some embodiments. Process 700 may be executed at S570 of process 500 as described above.

At S710, the signed and unsigned headers of a flash-stored bootloader image are loaded into RAM. With reference to bootloader image 400, RoT 210 may load unsigned header 410 and signed header 420 into RAM 214 at S710. Next, at S720, it is determined whether the bootloader header is signed with the owner's bootloader signing certificate. For example, RoT 210 may use the now-loaded bootloader signing public key of owner boot manifest 300 to decrypt unsigned header 410 and may compare the result to the bootloader hash of signed header 420. If the result is not identical to the hash, the boot process fails at S730. If the bootloader header is signed with the owner's bootloader signing certificate, RoT 210 loads remaining bootloader image 430 into RAM 214 and begins execution at the entry point of bootloader image 430.

Figure 8:
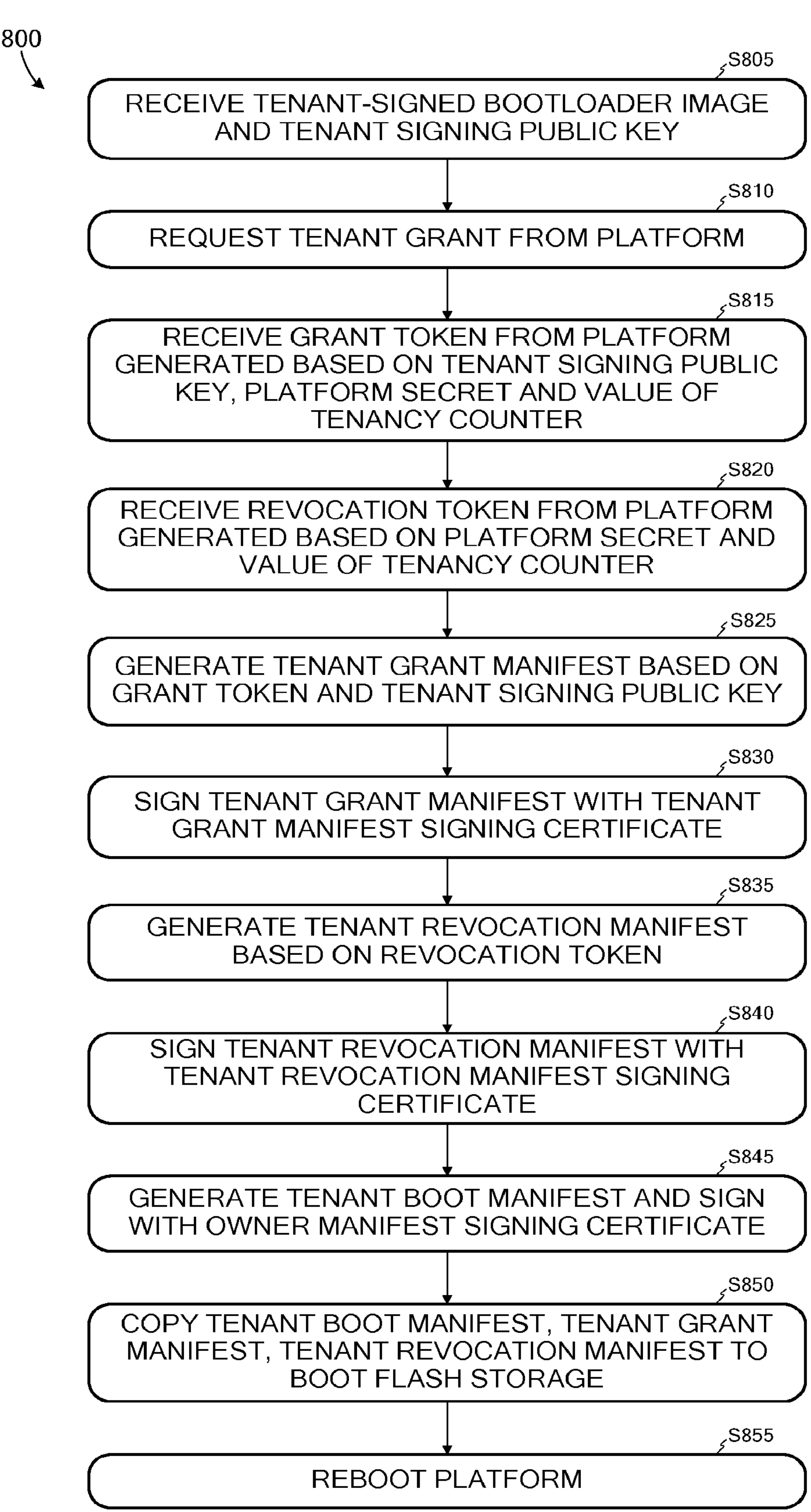
FIG. 8 is a flow diagram of a process to provision a tenancy grant according to some embodiments.

An owner may continue to operate a hardware platform using a boot flow consisting of process 500 and process 700 over any desired period time, without any changes to the boot manifest or tenancy counter. Once the owner determines to transfer tenancy to a given tenant, the transfer may be initiated via a tenancy grant provisioning process. FIG. 8 is a flow diagram of process 800 to provision a tenancy grant according to some embodiments. Although process 800 will be described as being performed by an owner, process 800 may be performed by any party having use of the owner's manifest signing certificate.

Initially, a bootloader image signed by the tenant's bootloader signing certificate and a tenant public key corresponding to the tenant's bootloader signing certificate are received at S805. The bootloader image and public key may be provided to the owner via any suitable means.

Figure 9:
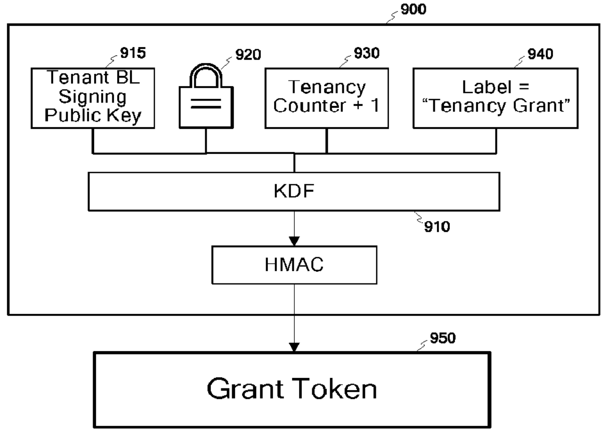
FIG. 9 illustrates generation of a grant token according to some embodiments.

A tenant grant is requested from the hardware platform by the owner at S810. In response, the hardware platform generates a grant token based on the tenant public key corresponding to the tenant's bootloader signing certificate, a platform secret and the current value of the tenancy counter. FIG. 9 illustrates system 900 for generation of grant token 950 according to some embodiments. System 900 may be implemented by security subsystem 216 of RoT 210. As shown, key derivation function 910 receives tenant bootloader signing public key 915, platform secret 920, a value equal to the tenancy counter value+1, and a label "Tenancy Grant". Platform secret 920 is unique to the hardware platform and is stored in any suitable secure manner therein. The tenancy counter value is read, for example, from secure storage device 240.

Figure 10:
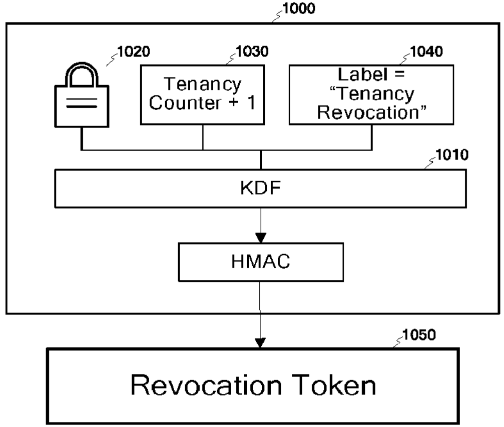
FIG. 10 illustrates generation of a revocation token according to some embodiments.

According to some embodiments, the request for a grant token at S810 also causes the hardware platform to generate a revocation token. FIG. 10 illustrates system 1000 for generation of revocation token 1050 according to some embodiments. System 1000 may be a same system as system 900 of FIG. 9. Key derivation function 1010 receives platform secret 920, a value equal to the tenancy counter value+1 (i.e., the same value used to generate grant token 950), and a label "Tenancy Revocation", and generates revocation token 1050 based thereon. The owner receives the grant token at S815 and the revocation token at S820.

Figure 11:
FIG. 11 illustrates the structure of a tenant grant manifest according to some embodiments.

The owner generates a tenant grant manifest at S825 based on the grant token and the tenant signing public key received at S805. FIG. 11 illustrates tenant grant manifest 1100 which may be generated at S825 according to some embodiments. Tenant grant manifest 1100 includes block header 1110, signed manifest header 1120 and manifest 1130. The owner generates the manifest hash of signed manifest header 1120 based on manifest 1130 and, at S830, generates signature 1110 from the manifest hash using the owner's tenant grant manifest signing certificate.

Figure 12:
FIG. 12 illustrates the structure of a tenant revocation manifest according to some embodiments.

The owner generates a tenant revocation manifest at S835 based on the revocation token and the tenant signing public key. FIG. 12 illustrates tenant revocation manifest 1200 which may be generated at S835 according to some embodiments. Tenant revocation manifest 1200 includes block header 1210, signed manifest header 1220 and manifest 1230 (i.e., the revocation token). The manifest hash of signed manifest header 1220 is generated based on manifest 1230. At S840, signature 1210 is generated from the manifest hash using the owner's tenant revocation manifest signing certificate.

According to some embodiments, a revocation token is not generated and no revocation token is included in the tenant revocation manifest 1200. Rather, the tenant revocation manifest generated at S835 is global and may be used as described below to revoke tenancy from any hardware platform.

Figure 13:
FIG. 13 illustrates the structure of a tenant boot manifest according to some embodiments.

A tenant boot manifest is generated at S845. As illustrated in the example of FIG. 13, manifest 1330 of tenant boot manifest 1300 may include the tenant grant manifest signing public key and the tenant revocation manifest signing public key. Tenant boot manifest 1300 also includes signed manifest header 1320 and unsigned manifest header 1310. Tenant boot manifest 1300 is signed using the owner's boot manifest signing certificate at S845.

Figure 15:
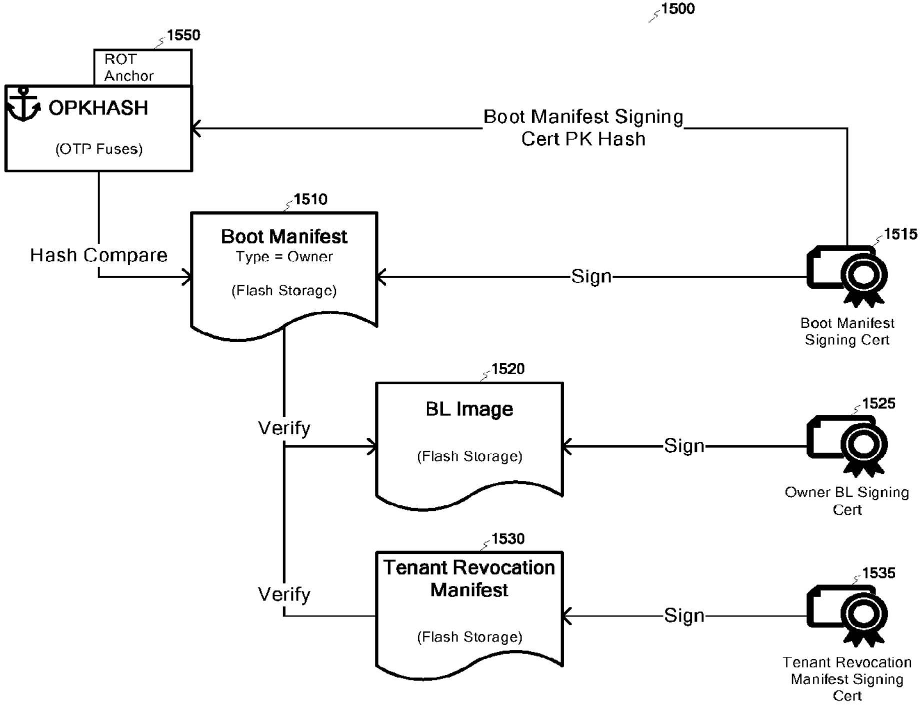
FIG. 15 illustrates an owner secure boot chain of trust according to some embodiments.
Figure 16:
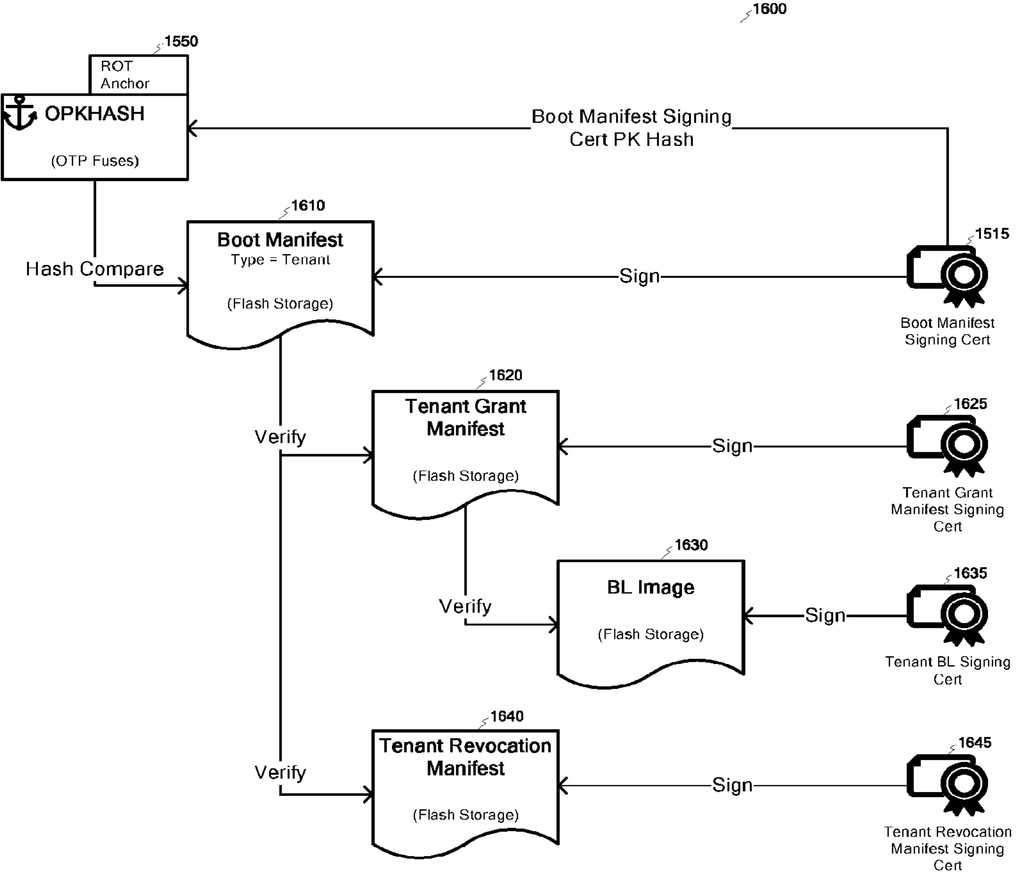
FIG. 16 illustrates a tenant secure boot chain of trust according to some embodiments.

FIGS. 15 and 16 illustrate chains of trust associated with the manifests and bootloader images described herein. FIG. 15 illustrates chain of trust 1500 associated with owner-associated boot manifest 1510, owner-associated bootloader image 1520 and owner-associated tenant revocation manifest 1530. In particular, owner-associated boot manifest 1510 is signed with boot manifest signing certificate 1515, and a hash of the public key corresponding to boot manifest signing certificate 1515 is a root of trust anchor 1550 stored in secure form on the hardware platform. Boot manifest 1510 becomes trusted upon comparison of root of trust anchor 1550 with a public key hash of boot manifest 1510.

Bootloader image 1520 is signed with bootloader signing certificate 1525 and may be verified based on the bootloader signing public key contained in now-trusted boot manifest 1510. Similarly, tenant revocation manifest 1530 is signed with tenant revocation manifest signing certificate 1535 and may be verified based on the tenant revocation manifest signing public key contained in now-trusted boot manifest 1510.

FIG. 16 illustrates chain of trust 1600 associated with tenant-associated boot manifest 1610, tenant-associated tenant grant manifest 1620, tenant-associated bootloader image 1630 and tenant-associated tenant revocation manifest 1640. As noted with respect to chain of trust 1500, a hash of the public key corresponding to boot manifest signing certificate 1515 is stored in secure form on the hardware platform as a root of trust anchor 1550. Also similar to chain of trust 1500, tenant-associated boot manifest 1610 is signed with boot manifest signing certificate 1515 corresponding to root of trust anchor 1550. Accordingly, tenant boot manifest 1610 also becomes trusted upon comparison of root of trust anchor 1550 with a public key hash of tenant boot manifest 1610.

Tenant grant manifest 1620 is signed with tenant grant manifest signing certificate 1625 and may be verified based on the tenant grant manifest signing public key contained in now-trusted tenant boot manifest 1610. Bootloader image 1520 is signed with tenant bootloader signing certificate 1635 and may be verified based on the bootloader signing public key contained in now-trusted tenant grant manifest 1620. Tenant revocation manifest 1640 is signed with tenant revocation manifest signing certificate 1645 and may be verified based on the tenant revocation manifest signing public key also contained in tenant boot manifest 1610.

Figure 14:
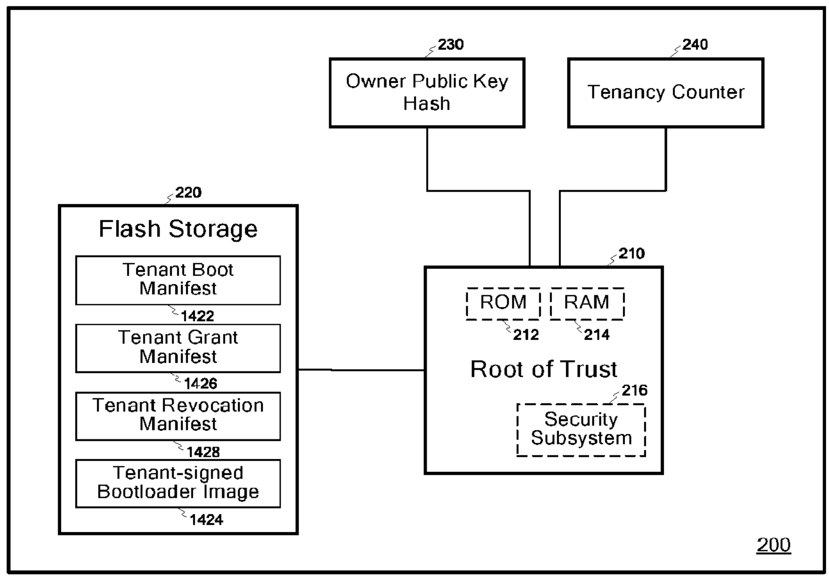
FIG. 14 is a block diagram of a portion of a hardware platform according to some embodiments.

Returning to process 800, the tenant boot manifest, the tenant grant manifest and the tenant revocation manifest are copied to the boot flash storage device of the hardware platform at S850. FIG. 14 illustrates motherboard 200 of FIG. 2 after tenancy grant provisioning according to process 800 according to some embodiments. Tenant boot manifest 1422 has overwritten owner boot manifest 222 and tenant-signed bootloader image 1424 has overwritten owner-signed bootloader image 224 within flash storage device 220. Also shown are tenant grant manifest 1426 and tenant revocation manifest 1428 copies to their respective partitions of flash storage device 220.

The hardware platform is then rebooted at S855 to continue the tenancy transfer. Flow therefore returns to S510 of process 500 and continues as described above. In particular, the unsigned header of the currently-stored boot manifest is loaded into RAM and the boot manifest signing public key is compared with the key stored on the hardware platform at S520. Assuming the comparison is successful, it is determined at S540 whether the boot manifest header was signed with the owner's boot manifest signing certificate. As described above, since the tenant boot manifest stored in the flash storage device during tenancy grant provisioning includes the boot manifest signing public key and was signed with the owner's boot manifest signing certificate, flow proceeds through S520 and S540 to S550 to load the unsigned manifest header and the signed manifest header of the tenant boot manifest into RAM.

A tenancy mode is determined at S560 based on the parity of the value stored in the tenancy counter. The counter has not yet been incremented in the present example, and therefore the parity indicates an owner mode. Flow therefore proceeds to S565, at which the flag of the stored boot manifest (i.e., the tenant boot manifest) is determined to indicate a "tenant" boot manifest type. Flow therefore proceeds to S575 to execute a tenancy transfer flow.

Figure 17:
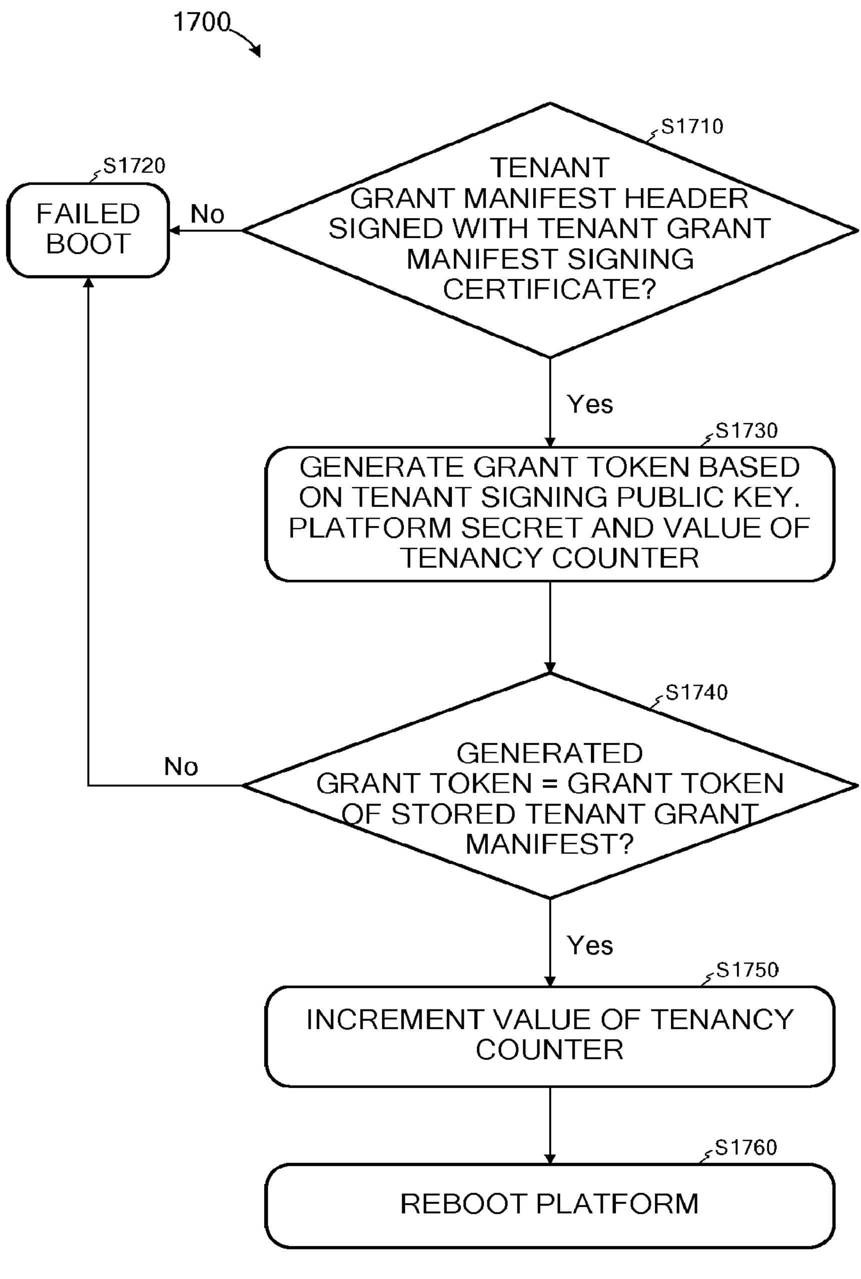
FIG. 17 is a diagram of a tenancy transfer flow according to some embodiments.

FIG. 17 illustrates process 1700 of a tenancy transfer flow according to some embodiments. At S1710, it is determined whether the tenant grant manifest header is signed with the owner's tenant grant manifest signing certificate. S1710 may therefore include loading the tenant grant manifest signed header and block header into RAM, decrypting the signature of the block header using the owner's corresponding tenant grant manifest signing public key, and comparing the result to the manifest hash stored in the tenant grant manifest signed header.

Upon verification of the signature, flow proceeds to S1730 to generate a grant token based on the tenant bootloader signing public key, the device secret of the hardware platform and on a current value of the tenancy counter. The hardware platform generates the grant token as illustrated in FIG. 9 and compares the generated token to the grant token of the stored tenant grant manifest at S1740. If the tokens match, the tenancy counter is incremented by 1 at S1750. In this regard, RoT 210 executes process 1700 via execution of code stored in ROM 212 and, since RoT has not yet exited ROM 212, RoT 210 is permitted to increment the tenancy counter value stored in storage device 240.

The hardware platform is rebooted again at S1760. In response, S510 through S550 of process 500 are executed as described above in view of the stored tenant boot manifest. At S560, it is determined that the parity of the tenancy counter value is odd, by virtue of the incrementing performed at S1750 of process 1700. The odd value corresponds to a tenancy mode, causing flow to proceed from S560 to S580. At S580, it is determined (as above) that the stored boot manifest is of "tenant" type and flow proceeds accordingly to S585 to execute a tenant secure boot flow.

Figure 18:
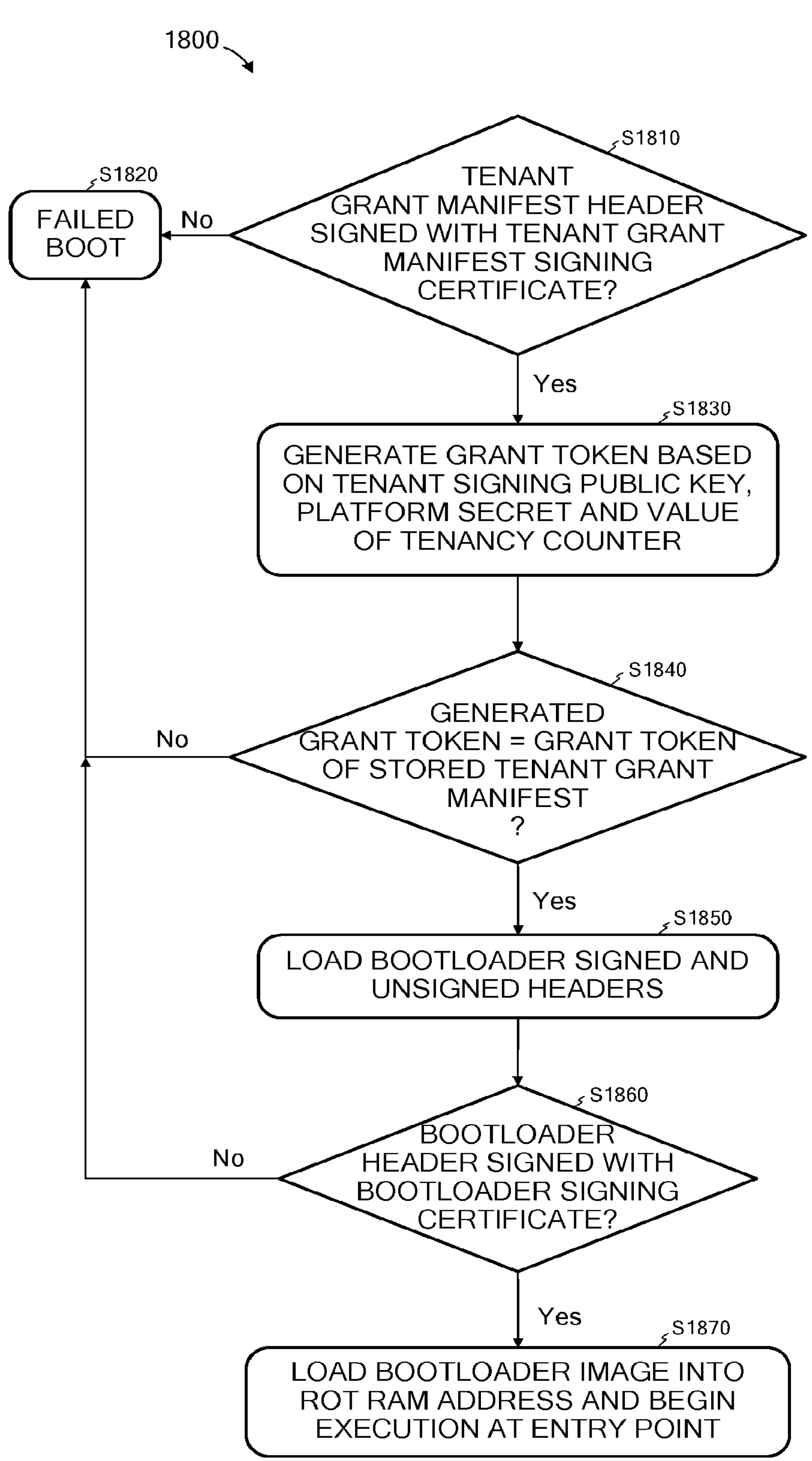
FIG. 18 is a diagram of a tenant secure boot flow according to some embodiments.

FIG. 18 illustrates process 1800 of a tenant secure boot flow according to some embodiments. S1810 through S1840 proceed identically to that described above with respect to S1710 through S1740 in order to verify that the tenant grant manifest was signed by the owner and is associated with the present hardware platform. Next, at S1850, the signed and unsigned headers of the stored bootloader image are loaded. The signature of the unsigned header is then verified against the signed header at S1860 based on the bootloader signing public key which is stored in the now-verified tenant grant manifest.

If the verification at S1860 is successful, the stored bootloader image is loaded into RAM at S1870 and execution thereof begins at a corresponding entry point. The tenant may thereafter control operation of the hardware platform as desired.

Tenancy revocation may be performed by a current tenant or by the owner of the hardware platform. Tenancy revocation is initiated by copying an owner-signed owner-type boot manifest, an owner-signed bootloader, and the tenant revocation manifest to the flash storage device. The tenant revocation manifest may have been previously copied to the flash storage device during tenancy grant provisioning as described above, in which case it need not be re-copied. In a case that the tenant wishes to initiate tenancy revocation, the owner-signed owner boot manifest and owner-signed bootloader may be acquired from the owner. The hardware platform is then rebooted to complete tenancy revocation.

Upon reboot, process 500 executes as described above to verify the boot manifest signing public key of the stored boot manifest at S520 and the boot manifest signature at S540. A tenant tenancy mode is determined at S560 because the tenancy counter remains at the same value which existed after completion of the last tenancy grant. Then, at S580, it is determined that the stored boot manifest (which is the owner boot manifest copied during tenancy revocation provisioning) is an "owner"-type boot manifest. Flow therefore proceeds to S590 to execute a tenancy revocation flow.

Figure 19:
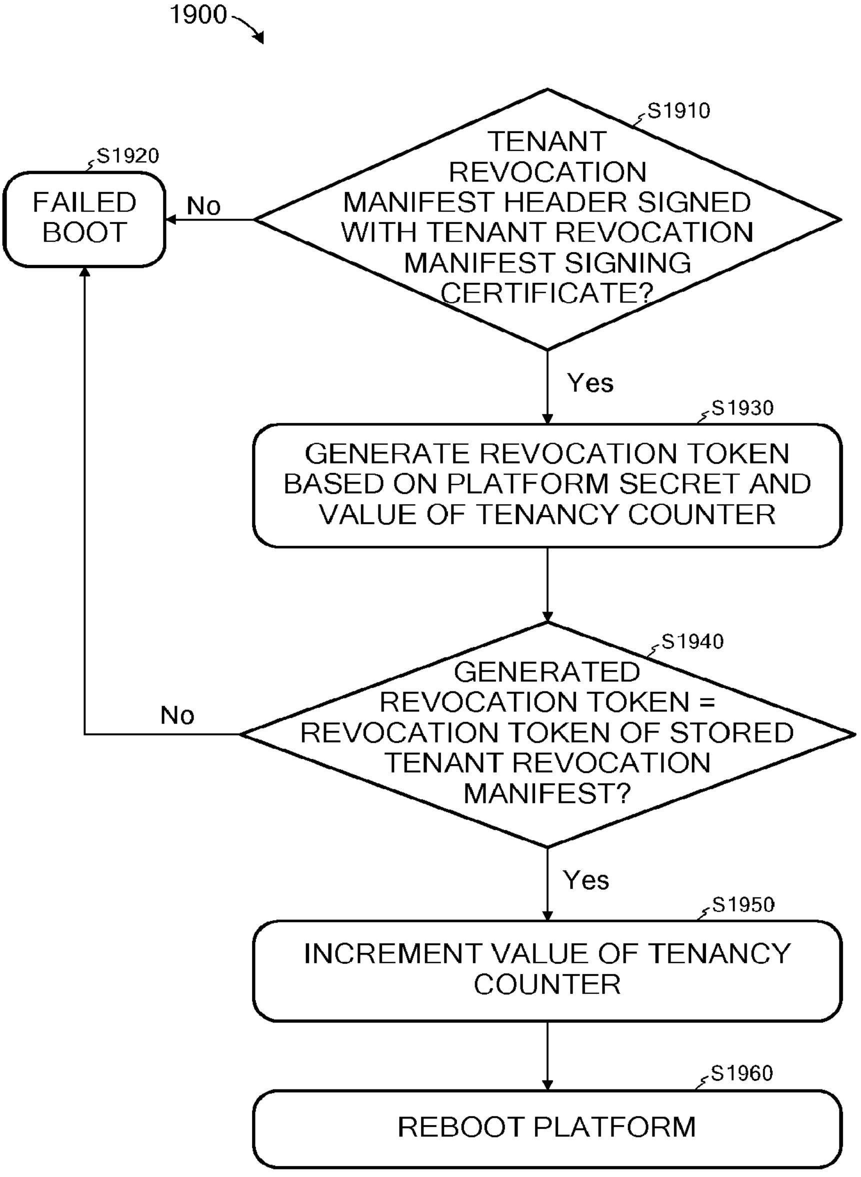
FIG. 19 is a diagram of a tenancy revocation flow according to some embodiments.

FIG. 19 illustrates process 1900 of a tenancy revocation flow according to some embodiments. At S1910, it is determined whether the tenant revocation manifest header is signed with the owner's tenant revocation manifest signing certificate. For example, the tenant revocation manifest signed header and block header are loaded into RAM, the signature of the block header is decrypted using the owner's corresponding tenant revocation manifest signing public key, and the result is compared to the manifest hash stored in the tenant revocation manifest signed header.

Assuming verification is successful, flow proceeds to S1930 to generate a revocation token based on the device secret of the hardware platform and on a current value of the tenancy counter. The hardware platform may generate the revocation token as illustrated in FIG. 10, except the actual tenancy counter value, rather than tenancy counter+1, is used as an input to key derivation function 1010, because the tenancy counter has been incremented since the revocation token of the tenant revocation manifest was originally generated. The generated token is compared to the revocation token of the stored tenant revocation manifest at S1940. If the tokens match, the tenancy counter is incremented by 1 at S1950 and the hardware platform is rebooted at S1960.

Upon reboot, the hardware platform has returned to owner mode (i.e., the value of the tenancy counter is odd) and includes an owner-type boot manifest. Accordingly, flow proceeds through process 500 and process 700 as described above.

Figure 20:
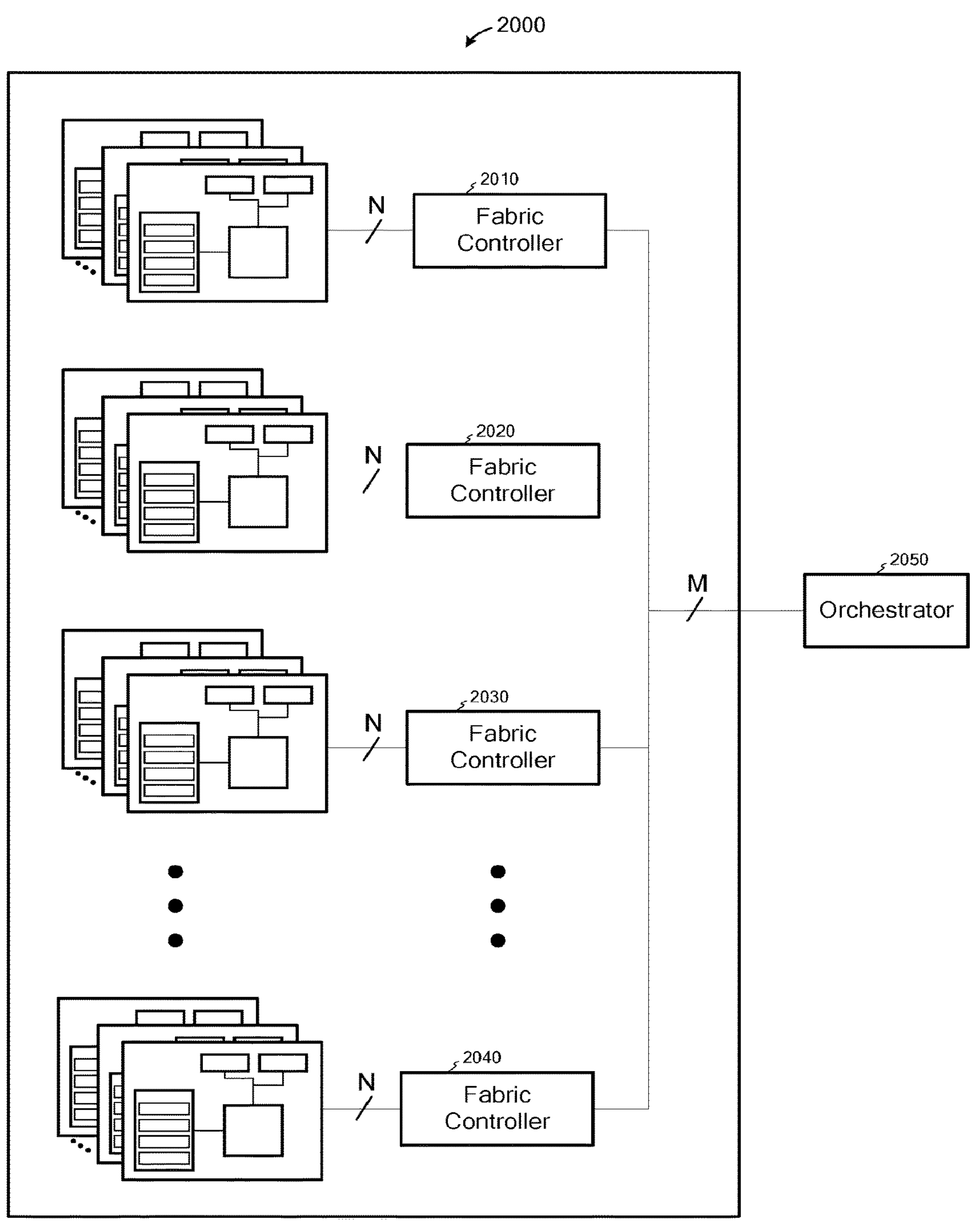
FIG. 20 is a block diagram of a datacenter architecture according to some embodiments.

FIG. 20 illustrates datacenter 2000 according to some embodiments. Datacenter 2000 includes M server racks, each of which is associated with a dedicated fabric controller 2010-2040. Orchestrator 2050 communicates with fabric controllers 2010-2040, and a given fabric controller communicates with each of N hardware platforms (e.g., server motherboards) mounted within a corresponding server rack. The number of hardware platforms per rack need not be identical.

Any or all of the hardware platforms of datacenter 2000 may include an RoT having ROM-stored program code which is executable to provide the functions described herein to its associated hardware platform. Tenancy of such hardware platforms may therefore be securely transferred between an owner and successive tenants as described herein.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

All processes mentioned herein may be embodied in processor-executable program code read from one or more of non-transitory computer-readable media, such as ROM, RAM, a hard disk drive, a solid-state drive, and a flash drive, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:

a first storage device storing a boot manifest, the boot manifest comprising a manifest type flag;

a second storage device storing a counter value; and a microcontroller in communication with the first storage device and the second storage device, the microcontroller to:

determine a manifest type of the boot manifest based on the manifest type flag;

determine a tenancy mode based on a parity of the counter value; and based on the manifest type and the tenancy mode, executing one of a first boot flow for an owner secure boot flow, a second boot flow for a tenancy transfer boot flow, a third boot flow for a tenant secure boot flow, or a fourth boot flow for a tenancy revocation boot flow.

2. The system of claim 1, wherein the first boot flow is executed when the manifest type is a first manifest type and the tenancy mode is a first tenancy mode.

3. The system of claim 1, wherein the second boot flow is executed when the manifest type is a first manifest type and the tenancy mode is a second tenancy mode.

4. The system of claim 1, wherein the third boot flow is executed when the manifest type is a second manifest type and the tenancy mode is a first tenancy mode.

5. The system of claim 1, wherein the fourth boot flow is executed when the manifest type is a second manifest type and the tenancy mode is a second tenancy mode.

6. The system of claim 1, further comprising:

a third storage device in communication with the microcontroller and storing a public key hash, wherein the boot manifest includes a boot manifest signing public key, and wherein the microcontroller is to determine, prior to determination of the manifest type, whether the stored public key hash is identical to the boot manifest signing public key.

7. The system of claim 6, the microcontroller to:

generate a first grant token based on the stored counter value; and the first storage device to:

store a tenant grant manifest including the first grant token and a bootloader signing public key, the tenant grant manifest signed by a tenant grant manifest signing certificate; and store a tenant boot manifest including a tenant grant manifest signing public key associated with the tenant grant manifest signing certificate.

8. The system of claim 7, the microcontroller to execute one of the boot flows to:

verify a signature of the tenant grant manifest based on the tenant grant manifest signing public key of the tenant boot manifest;

generate a second grant token based on the stored counter value;

determine whether the second grant token is identical to the first grant token of the tenant grant manifest; and based on a determination that the second grant token is identical to the first grant token of the tenant grant manifest, control the first storage device to increment the stored counter value.

9. The system of claim 8, the microcontroller to:

generate a first revocation token based on the stored counter value; and the first storage device to:

store a tenant revocation manifest including the first revocation token, the tenant revocation manifest signed by a tenant revocation manifest signing certificate, wherein the stored tenant boot manifest includes a tenant revocation manifest signing public key associated with the tenant revocation manifest signing certificate.

10. A system according to claim 9, the microcontroller to execute another one of the boot flows to:

verify a signature of the tenant revocation manifest based on the tenant revocation manifest signing public key of the tenant boot manifest;

generate a second revocation token based on the stored counter value;

determine whether the second revocation token is identical to the first revocation token of the tenant revocation manifest; and if it is determined that the second revocation token is identical to the first revocation token of the tenant grant manifest, control the first storage device to increment the stored counter value.

11. The system of claim 1, the microcontroller to:

generate a first grant token based on the stored counter value; and generate a first revocation token based on the stored counter value; and the first storage device to:

store a tenant grant manifest including the first grant token and a bootloader signing public key, the tenant grant manifest signed by a tenant grant manifest signing certificate;

store a tenant revocation manifest including the first revocation token, the tenant revocation manifest signed by a tenant revocation manifest signing certificate; and store a tenant boot manifest including a tenant grant manifest signing public key associated with the tenant grant manifest signing certificate and a tenant revocation manifest signing public key associated with the tenant revocation manifest signing certificate.

12. A method for booting a hardware platform comprising a stored public key hash, a stored boot manifest, the boot manifest including a boot manifest signing public key, and a stored tenancy counter value, the method comprising:

determining that the stored public key hash is identical to the boot manifest signing public key;

based on determining that the stored public key hash is identical to the boot manifest signing public key:

determining a manifest type of the stored boot manifest;

determining a tenancy mode based on the stored tenancy counter value; and based on the manifest type and the tenancy mode, executing one of a first boot flow for an owner secure boot flow, a second boot flow for a tenancy transfer boot flow, a third boot flow for a tenant secure boot flow, or a fourth boot flow for a tenancy revocation boot flow.

13. The method of claim 12, wherein the first boot flow is executed when the manifest type is a first manifest type and the tenancy mode is a first tenancy mode.

14. The method of claim 12, wherein the second boot flow is executed when the manifest type is a first manifest type and the tenancy mode is a second tenancy mode.

15. The method of claim 12, wherein the third boot flow is executed when the manifest type is a second manifest type and the tenancy mode is a first tenancy mode.

16. The method of claim 12, wherein the fourth boot flow is executed when the manifest type is a second manifest type and the tenancy mode is a second tenancy mode.

17. The method of claim 12, further comprising:

generating a first grant token based on the stored tenancy counter value;

storing a tenant grant manifest including the first grant token and a bootloader signing public key, the tenant grant manifest signed by a tenant grant manifest signing certificate; and storing a tenant boot manifest including a tenant grant manifest signing public key associated with the tenant grant manifest signing certificate, wherein the second boot flow comprises:

verifying a signature of the tenant grant manifest based on the tenant grant manifest signing public key of the tenant boot manifest;

generating a second grant token based on the stored tenancy counter value;

determining that the second grant token is identical to the first grant token of the tenant grant manifest; and based on the second grant token being identical to the first grant token of the tenant grant manifest, incrementing the stored tenancy counter value.

18. A non-transitory medium storing program code executable by a processor to cause a system to:

determine a manifest type of a stored boot manifest;

determine a tenancy mode based on a stored tenancy counter value; and based on the manifest type and the tenancy mode, executing one of a first boot flow for an owner secure boot flow, a second boot flow for a tenancy transfer boot flow, a third boot flow for a tenant secure boot flow, or a fourth boot flow for a tenancy revocation boot flow.

19. The non-transitory medium of claim 18, wherein the first boot flow is executed when the manifest type is a first manifest type and the tenancy mode is a first tenancy mode.

20. The non-transitory medium of claim 18, wherein the second boot flow is executed when the manifest type is a first manifest type and the tenancy mode is a second tenancy mode.

* * * * *